United States Patent [19]
Colonias

[11] Patent Number: 5,380,116
[45] Date of Patent: Jan. 10, 1995

[54] HIP RIDGE CONNECTION

[75] Inventor: Karen W. Colonias, Pleasant Hill, Calif.

[73] Assignee: Simpson Strong-Tie Company, Inc., San Leandro, Calif.

[21] Appl. No.: 136,693

[22] Filed: Oct. 14, 1993

[51] Int. Cl.$^6$ .............................................. E04B 1/00
[52] U.S. Cl. ..................... 403/232.1; 403/231; 403/170
[58] Field of Search .............. 403/232.1, 231, 237, 403/169, 170, 176, 217, 219; 52/702, 712, 90.1, 650.1, 648.1

[56] References Cited

U.S. PATENT DOCUMENTS

| | | |
|---|---|---|
| 1,657,243 | 1/1928 | Daniels . |
| 3,184,800 | 5/1965 | Nelson . |
| 3,256,030 | 6/1966 | Banse ................. 52/712 |
| 3,333,875 | 8/1967 | Tracy . |
| 3,423,898 | 1/1969 | Tracy . |
| 3,481,635 | 12/1969 | Tracy . |
| 3,596,941 | 8/1971 | Tracy . |
| 4,229,915 | 10/1980 | Snow et al. ............ 403/219 |
| 4,423,977 | 1/1984 | Gilb . |
| 4,498,801 | 2/1985 | Gilb . |
| 4,560,301 | 12/1985 | Gilb . |
| 4,713,923 | 12/1987 | Sielaff . |
| 4,817,359 | 4/1989 | Colonias . |
| 4,897,979 | 2/1990 | Colonias .......... 403/232.1 |
| 5,197,241 | 3/1993 | Romeo et al. ...... 403/232.1 |
| 5,253,465 | 10/1993 | Gilb ................. 403/232.1 |
| 5,274,981 | 1/1994 | Commins .......... 403/232.1 |

Primary Examiner—Randolph A. Reese
Assistant Examiner—Anthony Knight
Attorney, Agent, or Firm—James R. Cypher

[57] ABSTRACT

A hip ridge connection in a building structure in which two hip rafters are connected to a ridge member by a sheet metal hip ridge connector having a base which is in registration with the end face of the ridge member and has flanges fastened to the side faces of the ridge member, and two seat members holding the two hip members in selectable sloping relation to the ridge member. The same sheet metal hip ridge connector may also be used to connect two hip rafters to a wall or the face of two common rafters. Modified forms of the sheet metal hip ridge connector may be used to connect 2x or 4x dimensional lumber hip rafters to 2x or 4x dimensional ridge members. One sheet metal hip ridge connector is slope adjustable in the field up to a 12/12 pitch for the hip rafters.

6 Claims, 6 Drawing Sheets

HIP RIDGE CONNECTION

This invention relates to a hip rafter to ridge board connection; most commonly occurring in wood frame buildings having a stick-framed roof of either dimensional lumber or plywood I-rafters. The invention may be used in traditional hip roofs which is one of the four basic roof shapes, or it may be used in roofs which are a combination of the basic shapes.

A hip is defined as the outside corner where two planes of a roof meet. It is comprised of a hip rafter at the corner and jack rafters from the hip to the eave. The hip rafter is supported at its lower end by the wall at plate level (or by a post) at its upper end by the ridge (or by a wall).

Hips (45° members off the ridge) are commonly used to enhance the architectural appearance of the roof line for both residential and commercial structures. At the connection point there are two 45° skewed hips with slopes varying from 3/12 to 12/12 attaching to the end grain of the ridge member. The historical way of resolving this connection was to bevel cut the hips and toe nail them into the end grain of the ridge. The code recognizes that nailing into the end grain of a beam is not as effective as nailing perpendicular to the wood fiber and only assigns the nails 2/3 of the possible shear capacity.

Two 10 d toe nails per hip into the end grain will only achieve 155 pounds per hip. The new Hip ridge connection, in contrast, will resist approximately 1000 pounds per hip for the 2x connector and 2000 pounds per hip for the 4x connector.

The need for increasing the load capacity of hip connections has been due to the development of less expensive tile roofing material and the high fire danger with shake roofs. The weight of the tile roof on the hip/ridge joint has become of increasing concern.

SUMMARY OF THE PRESENT INVENTION

The hip ridge connection of the present invention is capable of providing the following:

1. increased load capacity to carry the load of heavy low cost fire resistant tile and provide greater resistance to wind and seismic forces.
2. accommodate various roof pitches without custom designing each connector.
3. an economically produced and installed connector
4. a connector which causes the center line of the hips to match the center line of the ridge.
5. a connector which can slide up and down on the ridge allowing the connector to position hips of varying size and pitch.
6. a single connector which can be used for any ridge depth and hip slope.
7. connectors which can accommodate a 2x ridge and 2x hips; a ridge and 4x hips and a 4x ridge and 2x hips.
8. a single piece connector which need not be welded.

DESCRIPTION OF THE INVENTION

The hip ridge connection 1 in a building structure of the present invention consists of: a ridge member 2 having an end face 3, a top face 4, and first and second side faces 5 and 6; a first hip rafter 7 having an end face 21 abutting the end face 3 of the ridge member 2 at a lateral angle 12 and vertical angle 13 thereto, and having a top face 8, first and second side faces 9 and 10, and a bottom face 11; a second hip rafter 14 having an end face 22 abutting the end face 3 of the ridge member 2 at a lateral angle 15 and a vertical angle 16 thereto, and having a top face 17, first and second side faces 18 and 19, and a bottom face 20; a single element sheet metal hip ridge connector 23 having: a base 24 having a center portion 25 for registration with a portion of the end face 3 of the ridge member 2, and first and second flanges 26 and 27 integrally connected thereto for registration with the first and second side faces 5 and 6 of the ridge member 2, a base extension member 28 integrally and angularly connected to the base member 24 along a line 29 and having a first base extension end 30 and a second base extension end 31, a first seat member 32 including a first hip seat 33 integrally connected to the base extension member 28 along the first base extension end 30 and first and second hip flanges 34 and 35 integrally connected to the first hip seat 33 and angularly related thereto and positioned and dimensioned for registration with the first and second side faces 9 and 10 of the first hip rafter 7, and a second seat member 36 including a second hip seat 37 integrally connected to the base extension member 28 along the second base extension end 31 and third and fourth hip flanges 38 and 39 integrally connected to the second hip seat 37 and angularly related thereto and positioned and dimensioned for registration with the first and second sides 17 and 18 of the second hip rafter 14; first fastener means 40 joining the first flange 26 of the base 24 to the ridge member 2; second fastener means 41 joining the second flange 27 of the base 24 to the ridge member 2; third fastener means 42 joining the first hip flange 34 to the first hip rafter 7;

fourth fastener means 43 joining the second hip flange 35 to the first hip rafter 7; fifth fastener means 44 joining the third hip flange 38 to the second hip rafter 14; and sixth fastener means 53 joining said fourth hip flange 39 to said second hip rafter 14.

The hip ridge connection 1 may also include: a first weakened plane means 45 formed in the base member 24 along a first bend line 47 defining the boundary between the center portion 25 and the first flange 26 permitting bending of the first flange 26 relative to the center portion 25 along the first bend line 47; a second weakened plane means 46 formed in the base member 24 along a second bend line 48 defining the boundary between the center portion 25 and the second flange 27 permitting bending of the second flange 27 relative to the center portion 25 along the second bend line 48; a third weakened plane means 49 formed between the base extension member 28 and the first hip seat 33 permitting bending of the first hip seat 33 relative to the base extension member 28 along a third bend line 50; and a fourth weakened plane means 51 formed between the base extension member 28 and the second hip seat 37 permitting bending of the second hip seat 37 relative to the base extension member 28 along a fourth bend line 52.

In a first form of the invention illustrated in FIGS. 2, 3, 4, 5, and 7, hip ridge connection 1 may be constructed so that the first and second weakened plane means 45 and 46 are located on the base member 24 at locations so as to cause the first and second flanges 26 and 27 to register with the ridge member formed from 2x dimensional lumber; and the first and second hip seats 33 and 37 are dimensioned so as to cause the first and second hip flanges 34 and 35 to register with the first hip rafter formed from 2x dimensional lumber.

Figures 8, 9:
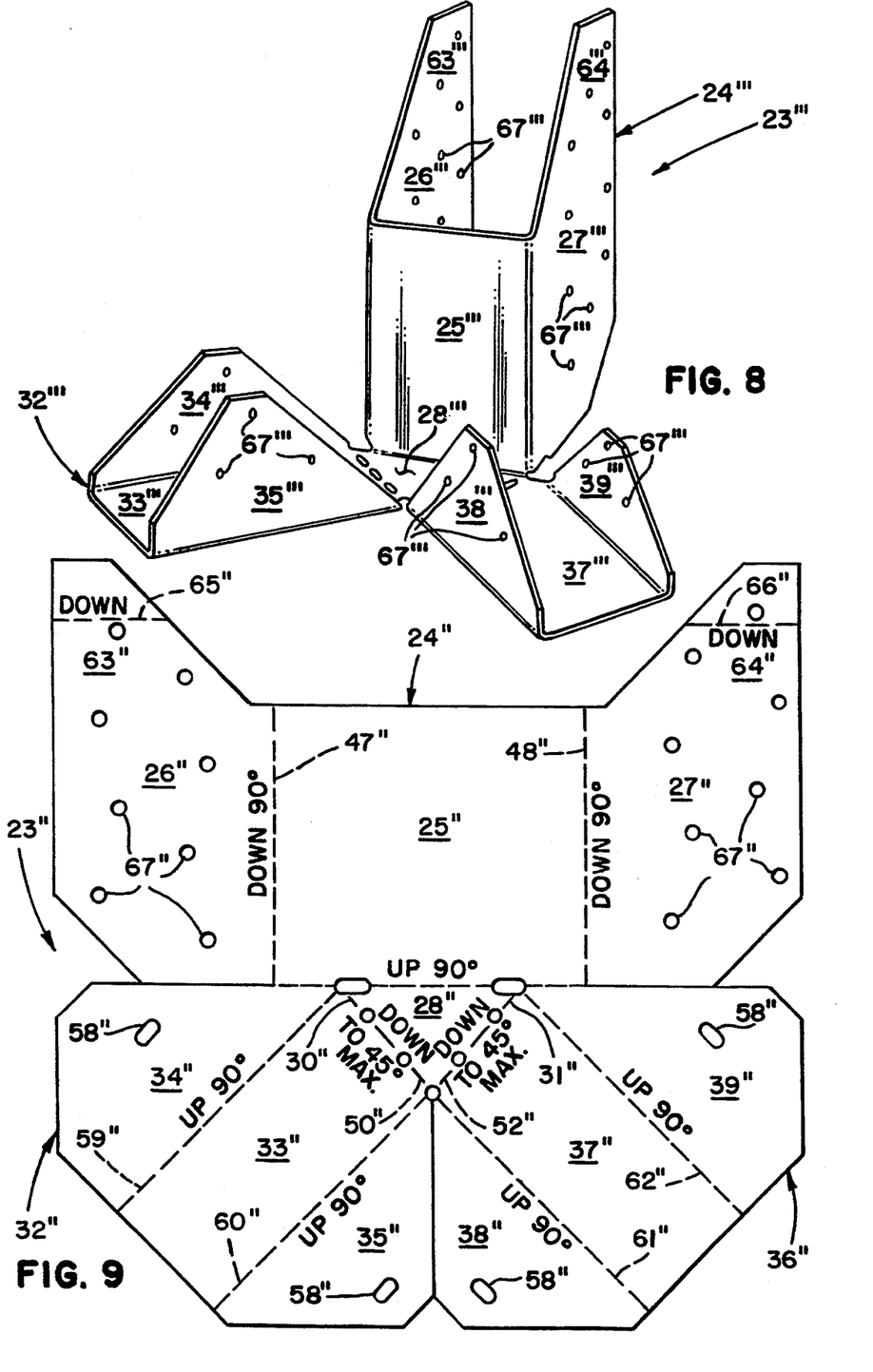
FIG. 8 is a perspective view of an alternate form of the invention illustrating a hip ridge connector for attaching hip rafters, each composed of two 2x members, to a 4x ridge member or two 2x members.
FIG. 9 is a top plan view of a blank of sheet metal used in constructing another form of hip ridge connector for attaching hip rafters of 2x members to a 4x ridge. Dual 2x members may be substituted for the 4x member.

In another form of the invention as illustrated in FIG. 9, construction of hip ridge connection 1 is such that the center portion 25″ is dimensioned and located on the base member 24″ so as to cause the first and second flanges 26″ and 27″ to register with the ridge member 2″ formed from dimensional lumber the equivalent of two 2x dimensional lumber members; and the first and second hip seats 33″ and 37″ are dimensioned so as to cause the first and second hip flanges 34″ and 35″ to register with the first hip rafter 7 formed from a single 2x dimensional lumber member and the third and fourth hip flanges 38″ and 39″ to register with the second hip rafter 14″ formed from a single 2x dimensional lumber member.

Figure 10:
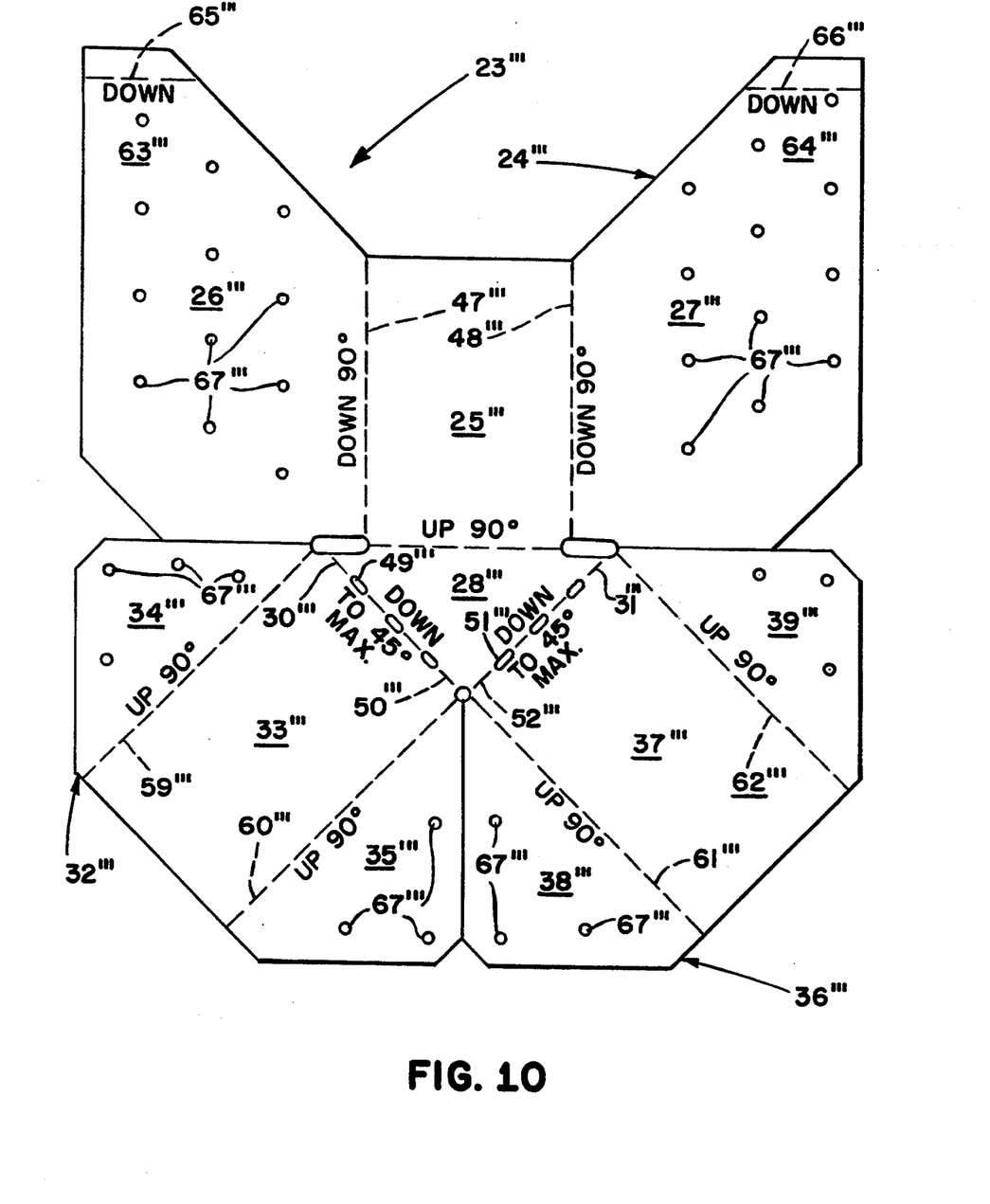
FIG. 10 is a top plan view of a blank of sheet metal used in constructing still another form of the invention. In this form, the hip ridge connector is used to attach two 4x hip rafters to a 4x ridge member. Dual 2x members may be substituted for the 4x members.

Still another form of the invention is illustrated in FIGS. 8 and 10 in which the hip ridge connection 1‴ is constructed so that the center portion 25‴ is dimensioned and located on the base member 24‴ so as to cause the first and second flanges 26 and 27 to register with the ridge member 2‴ formed from dimensional lumber the equivalent of two 2x dimensional lumber members; and the first and second hip seats 33‴ and 37‴ are dimensioned so as to cause the first and second hip flanges 34‴ and 35‴ to register with the first hip rafter 7‴ formed from dimensional lumber the equivalent of two 2x dimensional lumber members and third and fourth hip flanges 38‴ and 39‴ to register with the second hip rafter 14‴ formed from dimensional lumber the equivalent of two 2x dimensional lumber members.

Figure 1:
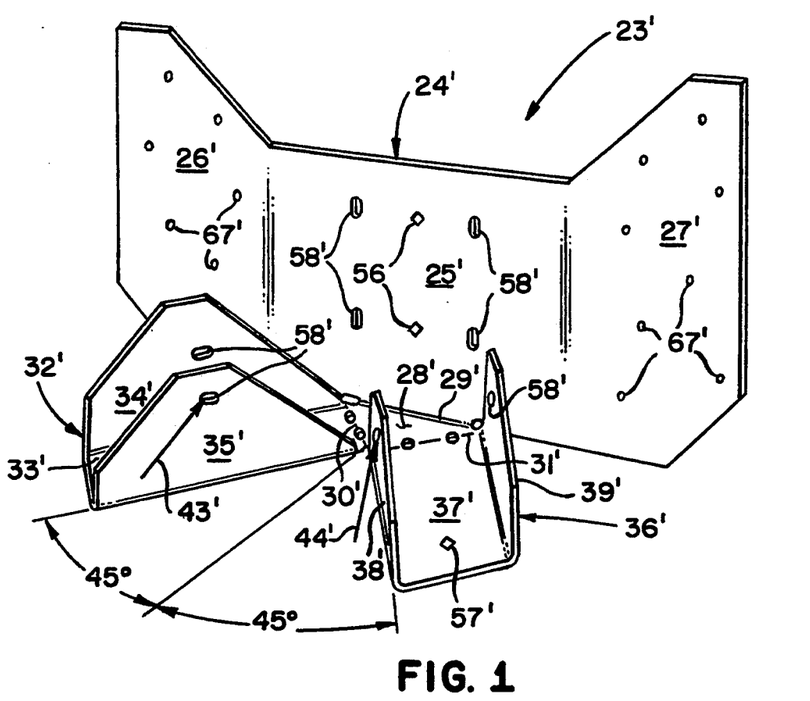
FIG. 1 is a perspective view of the hip ridge connector of the present invention.
Figure 6:
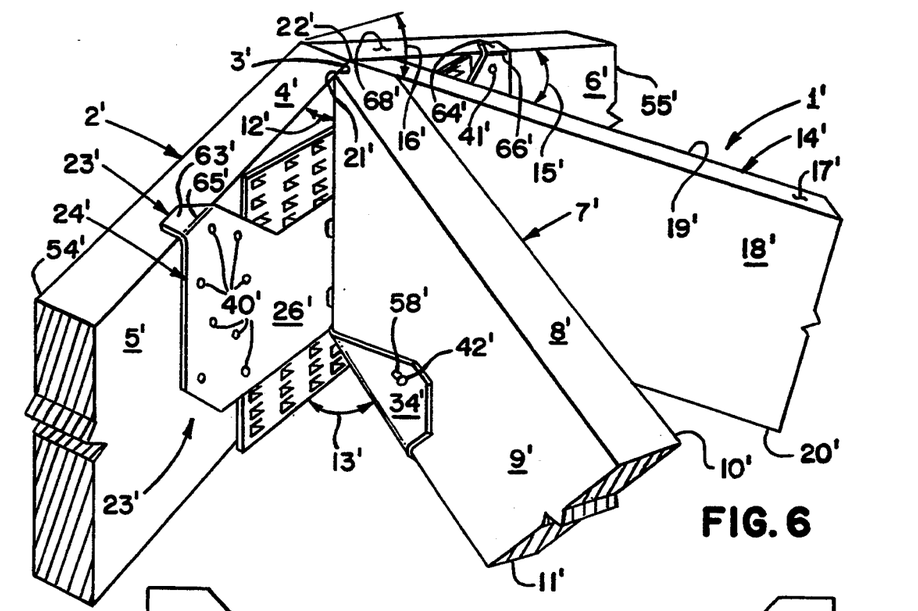
FIG. 6 is a perspective view of the hip ridge connector illustrated in FIG. 1 showing the installation of a pair of hip rafters connected to two common rafters joined by a pronged nailing member.

In still another form of the invention, referring to FIGS. 1 and 6, a hip ridge connection 1′ in a building structure is illustrated including: a wall means 2′ having end face 3′, a top face 4′, and first and second side faces 5′ and 6′; a first hip rafter 7′ having an end face 21′ abutting the end face 3′ of the wall member 2′ at a lateral angle 12′ and vertical angle 13′ thereto, and having a top face 8′, first and second side faces 9′ and 10′, and a bottom face 11′; a second hip rafter 14′ having an end face 22′ abutting said end face 3′ of said wall member 2′ at a lateral angle 15′ and a vertical angle 16′ thereto, and having a top face 17′, first and second side faces 18′ and 19′, and a bottom face 20′; a single element sheet metal hip ridge connector 23′ having: a base 24′ having a center portion 25′ for registration with a portion of said end face 3 of said wall means 2′, and first and second flanges 26′ and 27′ integrally connected thereto for registration with said first and second side faces 5′ and 6′ of said wall means 2′, a base extension member 28′ integrally and angularly connected to said base member 24′ along a line 29′ and having a first base extension end 30′ and a second base extension end 31′, a first seat member 32′ including a first hip seat 33′ integrally connected to said base extension member 28′ along said first base extension end 30′ and first and second hip flanges 34′ and 35′ integrally connected to said first hip seat 33 and angularly related thereto and positioned and dimensioned for registration with said first and second side faces 9′ and 10′ of said first hip rafter 7′, and a second seat member 36′ including a second hip seat 37′ integrally connected to said base extension member 28′ along said second base extension end 31′ and third and fourth hip flanges 38′ and 39′ integrally connected to said second hip seat 37′ and angularly related thereto and positioned and dimensioned for registration with said first and second sides 18′ and 19′ of said second hip rafter 14′; first fastener means 40′ joining said first flange 26′ of said base 24′ to said wall means 2′; second fastener means 41′ joining said second flange 27′ of said base 24′ to said wall means 2′; third fastener means 42′ joining said first hip flange 34′ to said first hip rafter 7′; fourth fastener means 43′ joining said second hip flange 35′ to said first hip rafter 7′; fifth fastener means 44′ joining said third hip flange 38′ to said second hip rafter 14′; and sixth fastener means 53′ (not shown) joining said fourth hip flange 39′ to said second hip rafter 14′.

FABRICATION

The hip ridge connector 23, 23′, 23″, and 23‴ is presently commercially available in three sizes. The hip ridge connector 23 for 2x ridge members 2 and 2x hip rafters 7 and 14 is illustrated in FIGS. 2, 3, 4, and 6. The hip ridge connector 23″ illustrated in FIGS. 8 and 9 is dimensioned for use with two 2x ridge members and two 2x members for each hip rafter. The hip ridge connector 23‴ illustrated in FIG. 10 is dimensioned for a ridge member and two hip rafters; all of which are two 2x members. The hip ridge connector 23′ illustrated in FIGS. 1 and 6 is identical to the hip ridge connector 23 except that by making different bends it is suitable for connecting hip rafters to a wall or first and second common rafters 54 and 55 as shown in FIG. 6. It should be noted that the form of the hip ridge connector 23′ shown in FIGS. 1 and 6 may be used in the same manner for the hip ridge connectors 23″ and 23‴ illustrated in FIGS. 8 and 9 and FIG. 10.

As presently constructed hip ridge connectors 23, 23′ and 23″ are fabricated from galvanized 16 gauge sheet metal and hip ridge connector 23‴ is fabricated from galvanized 14 gauge sheet metal. Diamond holes 56 are optional and are used in installation to initially attach the hip ridge connector to the ridge member 2 or wall means 2'. All forms of the hip ridge connectors may carry the diamond holes 56.

Diamond holes 57', as illustrated in FIG. 1, may be placed in first hip seats 33' and 37' for the receipt of nails which may be driven into the first and second hip rafters 7 and 14. Other forms of the hip ridge connector may also have similar diamond fastener openings.

Obround openings 58, 58', and 58" may be provided as illustrated to provide for slant nailing especially where the hip rafters and ridge member are 2x dimensional lumber.

Figure 7:
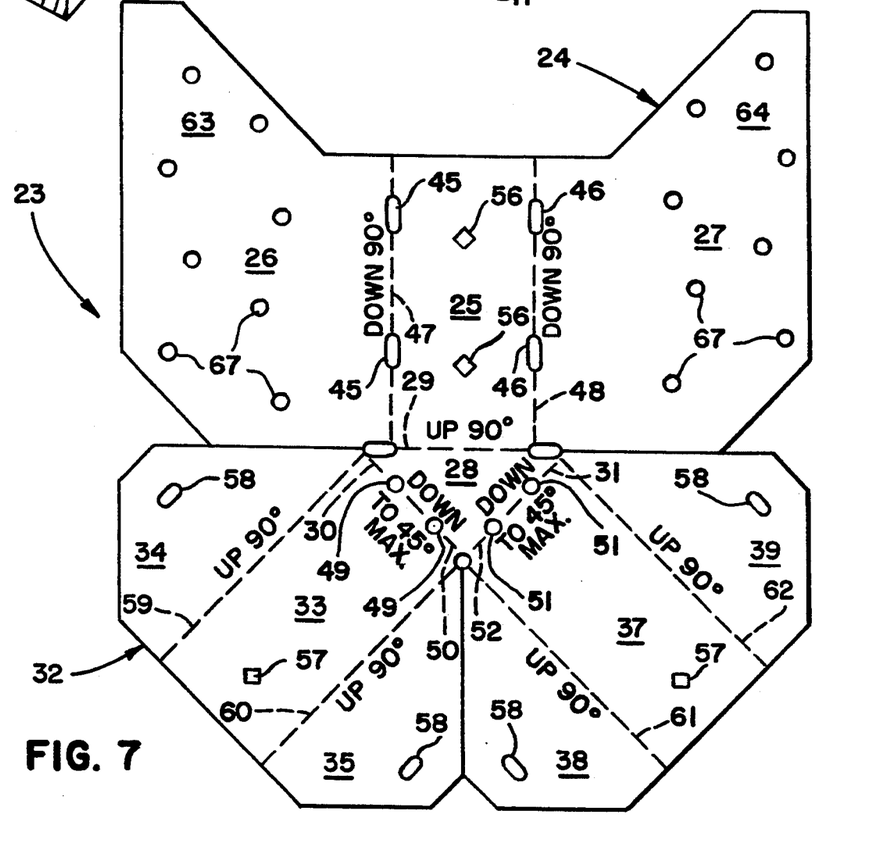
FIG. 7 is a top plan view of a blank of sheet metal used in constructing the hip ridge connector illustrated in FIG. 1.

Referring to FIG. 7, fabrication of first and second hip flanges 34 and 35 is preferably completed at the factory prior to shipment by bending first seat member 32 upwardly 90° along first and second bend lines 59 and 60 as illustrated. Likewise, third and fourth hip flanges 38 and 39 are formed by bending second seat member 36 upwardly 90° along bend lines 61 and 62.

Figure 2:
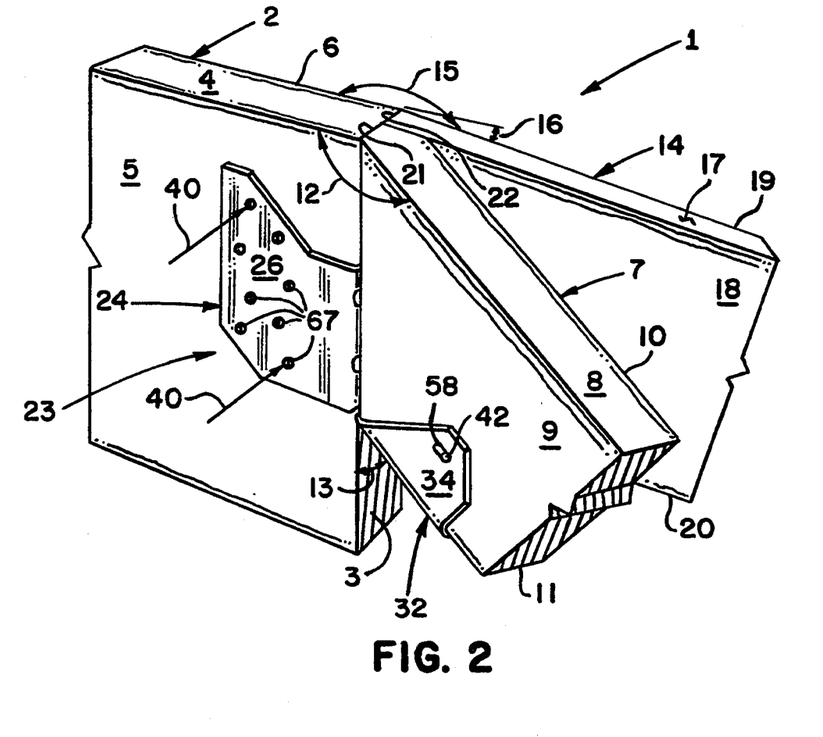
FIG. 2 is a perspective view of a hip ridge connection showing a typical connection of two hip rafters to a ridge member by a hip ridge connector of the present invention.

The blank illustrated in FIG. 7 is used both for forming the hip ridge connectors 23 and 23' illustrated in FIG. 2 and FIG. 6. Where the hip ridge connector 23' is to be used for attachment to a wall means 2' consisting of abutting first and second common rafters 54' and 55' base 24' is preferably formed with first and second wings 63 and 64 which then may be field bent along selected first and second bend lines 65' and 66'. Bend lines 65' and 66' will vary depending upon the size and slope of the first and second hip rafters 7' and 14' and the size and slope of the first and second common rafters 54' and 55'. Where the hip ridge connector 23 is to be attached to a ridge member 2 as illustrated in FIG. 1, Base 24 is preferably pre-bent at the factory by bending first and second flanges 26 and 27 downwardly 90° along first and second bend lines 47 and 48.

Referring to FIG. 9, fabrication of first and second hip flanges 34" and 35" is preferably completed at the factory prior to shipment by bending first seat member 32" upwardly 90° along first and second bend lines 59" and 60" as illustrated. Likewise, third and fourth hip flanges 38" and 39" are formed by bending second seat member 36" upwardly 90° along bend lines 61" and 62".

The blank illustrated in FIG. 9 is used both for forming the hip ridge connectors 23" used for attachment to a wall means such as wall means 2' illustrated in FIG. 6 and for attachment to a ridge member as illustrated in FIG. 2. Base 24" is preferably formed with first and second wings 63" and 64" which then may be field bent along selected first and second bend lines 65" and 66". Bend lines 65" and 66" will vary depending upon the size and slope of the first and second hip rafters 7' and 14' and the size and slope of the first and second common rafters 54' and 55'. Where the hip ridge connector 23" is to be attached to a ridge member 2 as illustrated in FIG. 1, Base 24" is preferably pre-bent at the factory by bending first and second flanges 26" and 27" downwardly 90° along first and second bend lines 47" and 48".

Referring to FIGS. 8 and 10, fabrication of first and second hip flanges 34'" and 35'" is preferably completed at the factory prior to shipment by bending first seat member 32'" upwardly 90° along first and second bend lines 59'" and 60'" as illustrated. Likewise, third and fourth hip flanges 38'" and 39'" are formed by bending second seat member 36'" upwardly 90° along bend lines 61'" and 62'".

The blank illustrated in FIG. 10 is used both for forming the hip ridge connectors 23'" used for attachment to a wall means such as wall means 2' illustrated in FIG. 6 and for attachment to a ridge member as illustrated in FIG. 2. Base 24'" is preferably formed with first and second wings 63'" and 64'" which then may be field bent along selected first and second bend lines 65'" and 66'". Bend lines 65'" and 66'" will vary depending upon the size and slope of the first and second hip rafters 7' and 14' and the size and slope of the first and second common rafters 54' and 55'. Where the hip ridge connector 23'" is to be attached to a ridge member 2 as illustrated in FIG. 1, base 24'" is preferably pre-bent at the factory by bending first and second flanges 26'" and 27'" downwardly 90° along first and second bend lines 47'" and 48'". All forms of the invention are preferably formed with round fastener openings 67, 67', 67", and 67'" where required and as illustrated in the drawings. No attempt has been made to label every fastener opening.

FASTENERS

Fasteners are a part of the hip ridge connections described in this specification and set forth in the claims. Various types of fasteners may be used such as nails driven by manual hammers or automatic nailing guns, screws either hand driven or by powered screw guns. The fasteners may be inserted through the openings provided or they may be driven through the metal by special impact hammers or automatic nailing guns without the need for pre-perforated openings.

When using nail fasteners with the hip ridge connectors 23 and 23' illustrated in FIGS. 1, 2, 3, 4, 5, 6 and 7; sixteen 10 d × 1½ nails may be driven into the carrying member such as the ridge member 2 or wall means 2' and two 10 d × 1½ nails may be driven into each first and second hip rafter 7 or 7' and 14 or 14'. With such a nailing schedule and 2x wood member sizes, a code allowed uplift of 290 pounds, a floor load of 865 pounds and a roof load of 975 pounds is allowable.

The nailing schedule for a hip ridge connector 23" illustrated in FIG. 9 is to use sixteen 16 d nails driven into the carrying member such as a ridge member 2 having a 4x dimension or a wall means 2' consisting of either 4x dimensional lumber or two 2x members and 2 10 d × 1½ nails into each hip rafter of 2x dimensional lumber. A nailing schedule as just described will resist a code approved 290 pounds of uplift, a floor load of 1050 pounds and a roof load of 1050 pounds.

The nailing schedule for a hip ridge connector 23'" illustrated in FIGS. 8 and 10 is to use twenty four 16 d nails in the carrying member, and 6 16 d nails in each hip rafter. This nailing schedule will resist a code approved uplift of 480 pounds, a floor load of 1,620 pounds and a roof load of 1,775 pounds.

INSTALLATION

Figure 3:
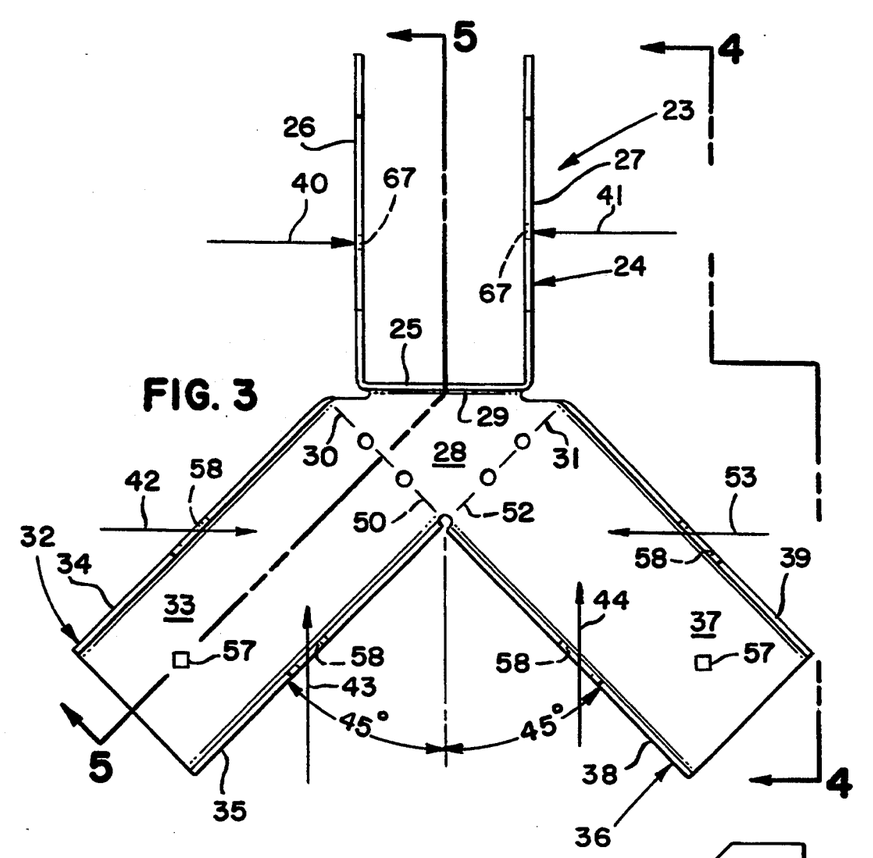
FIG. 3 is a top plan view of the hip ridge connector illustrated in FIG. 2.
Figure 4:
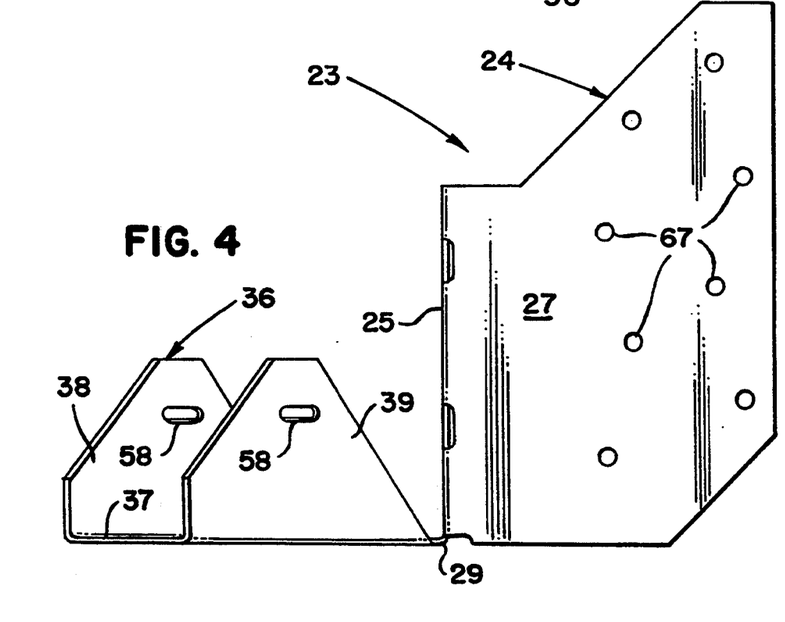
FIG. 4 is a side elevation view of the hip ridge connector taken along line 4—4 in FIG. 3.
Figure 5:
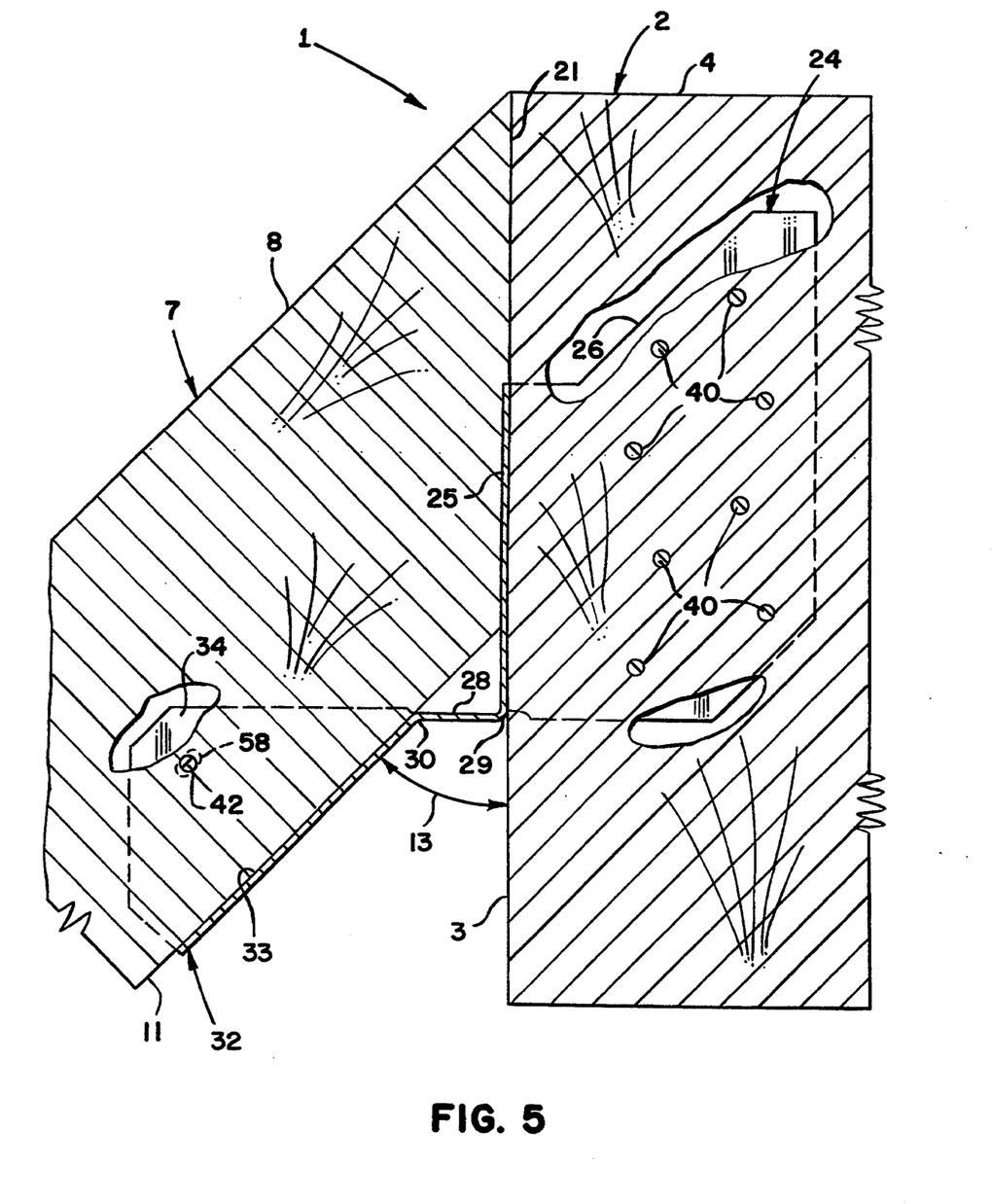
FIG. 5 is a cross sectional view of the hip ridge connector taken along line 5-5 in FIG. 3 with the hip rafters installed as illustrated in FIG. 2 and, with portions of the hip rafter and ridge member removed to show portions of the hip ridge connector.

To install the hip ridge connector 23 made from the blank illustrated in FIG. 7 on a ridge member 2 as illustrated in FIG. 2, center portion 25 of base 24 is placed against end face 3 at the proper location and fasteners are inserted through diamond holes 56 in center portion 25 of base 24. First and second flanges 26 and 27 are then bent back flush with first and second side faces 5 and 6 of ridge member 2 and nailed or secured by screws with first and second fastener means 40 and 41. To achieve full bearing capacity, the first and second hip rafters 7 and 14 should be double bevel cut as illustrated in FIG. 2. The first hip rafter 7 is then placed on first hip seat 33 and when the proper slope has been selected by bending first seat member 32 along first base extension end 30, third and fourth fastener means 42 and 43 are driven, preferably at an angle, as illustrated in FIG. 3 through obround openings 58 in first and second hip flanges 34 and 35. Next, second hip rafter 14 may be placed on second hip seat 37, the slope adjusted by bending second seat member 36 along second base extension end 31, and fifth and sixth fastener means 44 and 53 are inserted through obround openings 58 in third and fourth hip flanges 38 and 39 at an angle as illustrated in FIG. 3.

To install hip ridge connector 23' such as the one made from the blank illustrated in FIG. 7 on the wall means 2' as illustrated in FIG. 6, center portion 25' of base 24' is centered on the intersection of first and second common rafters 54' and 55' and fasteners placed through diamond openings 56'. First and second fastener means 40' and 41' are then driven through openings 67 in first and second flanges 26 and 27. First and second wings 63' and 64' are than bent over along selected bend lines 65' and 66' until they are flush with top faces 4' and 68' of first and second common rafters 54' and 55'. To achieve full bearing capacity, the first and second hip rafters 7' and 14' should be double bevel cut as illustrated in FIG. 6. The first hip rafter 7' is then placed on first hip seat 33' and when the proper slope has been selected, by bending first seat member 32' along first base extension end 30', third and fourth fastener means 42' and 43' are driven, preferably at an angle, through obround openings 58' in first and second hip flanges 34' and 35'. Next, second hip rafter 14' may be placed on second hip seat 37', the slope adjusted, and when the proper slope has been selected by bending second seat member 36' along second base extension end 31', fifth and sixth fastener means 44' and 53' are inserted through obround openings 58' in third and fourth hip flanges 38' and 39'.

Installation of the hip ridge connectors illustrated in FIGS. 8, 9 and 10 are virtually identical to the installations just described and are not repeated.

I claim:

1. A hip ridge connection in a building structure comprising:
   a. a ridge member having an end face, a top face and first and second side faces;
   b. a first hip rafter having an end face abutting said end face of said ridge member at a lateral angle and vertical angle thereto, and having a top face, first and second side faces, and a bottom face;
   c. a second hip rafter having an end face abutting said end face of said ridge member at a lateral angle and a vertical angle thereto, and having a top face, first and second side faces, and a bottom face;
   d. a single element sheet metal hip ridge connector having:
      1. a base having a center portion for registration with a portion of said end face of said ridge member, and first and second flanges integrally connected thereto for registration with said first and second side faces of said ridge member,
      2. a base extension member integrally and angularly connected to said base member along a line and having a first base extension end and a second base extension end,
      3. a first seat member including a first hip seat integrally connected to said base extension member along said first base extension end and first and second hip flanges integrally connected to said first hip seat and angularly related thereto and positioned and dimensioned for registration with said first and second side faces of said first hip rafter, and
      4. a second seat member including a second hip seat integrally connected to said base extension member along said second base extension end and third and fourth hip flanges integrally connected to said second hip seat and angularly related thereto and positioned and dimensioned for registration with said first and second sides of said second hip rafter;
   e. first fastener means joining said first flange of said base to said ridge member;
   f. second fastener means joining said second flange of said base to said ridge member;
   g. third fastener means joining said first hip flange to said first hip rafter;
   h. fourth fastener means joining said second hip flange to said first hip rafter;
   i. fifth fastener means joining said third hip flange to said second hip rafter; and
   j. sixth fastener means joining said fourth hip flange to said second hip rafter.

2. A hip ridge connection as defined in claim 1 comprising;
   a. first weakened plane means formed in said base member along a first bend line defining the boundary between said center portion and said first flange permitting bending of said first flange relative to said center portion along said first bend line;
   b. second weakened plane means formed in said base member along a second bend line defining the boundary between said center portion and said second flange permitting bending of said second flange relative to said center portion along said second bend line;
   c. third weakened plane means formed between said base extension member and said first hip seat permitting bending of said first hip seat relative to said base extension member along a third bend line; and
   d. fourth weakened plane means formed between said base extension member and said second hip seat permitting bending of said second hip seat relative to said base extension member along a fourth bend line.

3. A hip ridge connection as defined in claim 2 comprising:
   a. said first and second weakened plane means are located on said base member at locations so as to cause said first and second flanges to register with said ridge member formed from 2x dimensional lumber; and
   b. said first and second hip seats are dimensioned so as to cause said first and second hip flanges to register with said first hip rafter formed from 2x dimensional lumber.

4. A hip ridge connection as defined in claim 1 comprising:
   a. said center portion is dimensioned and located on said base member so as to cause said first and second flanges to register with said ridge member formed from dimensional lumber the equivalent of two 2x dimensional lumber members; and
   b. said first and second hip seats are dimensioned so as to cause said first and second hip flanges to register with said first hip rafter formed from 2x dimensional lumber and said third and fourth hip flanges to register with said second hip rafter formed from 2x dimensional lumber.

5. A hip ridge connection as defined in claim 1 comprising:
 a. said center portion is dimensioned and located on said base member so as to cause said first and second flanges to register with said ridge member formed from dimensional lumber the equivalent of two 2x dimensional lumber members; and
 b. said first and second hip seats and are dimensioned so as to cause said first and second hip flanges to register with said first hip rafter formed from dimensional lumber the equivalent of two 2x dimensional lumber members and third and fourth hip flanges to register with said second hip rafter formed from dimensional lumber the equivalent of two 2x dimensional lumber members.

6. A hip ridge connection in a building structure comprising:
 a. a wall means having end face, a top face, and first and second side faces;
 b. a first hip rafter having an end face abutting said end face of said wall member at a lateral angle and vertical angle thereto, and having a top face, first and second side faces, and a bottom face;
 c. a second hip rafter having an end face abutting said end face of said wall member at a lateral angle and a vertical angle thereto, and having a top face, first and second side faces, and a bottom face;
 d. a single element sheet metal hip ridge connector having:
  1. a base having a center portion for registration with a portion of said end face of said wall means, and first and second flanges integrally connected thereto for registration with said first and second side faces of said wall means,
  2. a base extension member integrally and angularly connected to said base member along a line and having a first base extension end and a second base extension,
  3. a first seat member including a first hip seat integrally connected to said base extension member along said first base extension end and first and second hip flanges integrally connected to said first hip seat and angularly related thereto and positioned and dimensioned for registration with said first and second side faces of said first hip rafter, and
  4. a second seat member including a second hip seat integrally connected to said base extension member along said second base extension end and third and fourth hip flanges integrally connected to said second hip seat and angularly related thereto and positioned and dimensioned for registration with said first and second sides of said second hip rafter;
 e. first fastener means joining said first flange of said base to said wall means;
 f. second fastener means joining said second flange of said base to said wall means;
 g. third fastener means joining said first hip flange to said first hip rafter;
 h. fourth fastener means joining said second hip flange to said first hip rafter;
 i. fifth fastener means joining said third hip flange to said second hip rafter; and
 j. sixth fastener means joining said fourth hip flange to said second hip rafter.

* * * * *